United States Patent
Zhuang et al.

(10) Patent No.: US 9,823,875 B2
(45) Date of Patent: Nov. 21, 2017

(54) TRANSPARENT HYBRID DATA STORAGE

(71) Applicant: LinkedIn Corporation, Mountain View, CA (US)

(72) Inventors: Zhenyun Zhuang, Belmont, CA (US); Sergiy Zhuk, Saratoga, CA (US); Haricharan K. Ramachandra, Fremont, CA (US); Cuong H. Tran, Los Altos, CA (US); Badrinath K. Sridharan, Saratoga, CA (US)

(73) Assignee: LinkedIn Coporation, Sunnyvale, CA (US)

( * ) Notice: Subject to any disclaimer, the term of this patent is extended or adjusted under 35 U.S.C. 154(b) by 44 days.

(21) Appl. No.: 14/841,525

(22) Filed: Aug. 31, 2015

(65) Prior Publication Data

US 2017/0060472 A1    Mar. 2, 2017

(51) Int. Cl.
G06F 12/00    (2006.01)
G06F 3/06    (2006.01)

(52) U.S. Cl.
CPC ............ *G06F 3/0649* (2013.01); *G06F 3/068* (2013.01); *G06F 3/0616* (2013.01); *G06F 3/0647* (2013.01); *G06F 3/0685* (2013.01); *G06F 3/0688* (2013.01); *G06F 3/0689* (2013.01)

(58) Field of Classification Search
CPC .... G06F 3/0649; G06F 3/0688; G06F 3/0689; G06F 3/0616
USPC ................................. 711/103, 158
See application file for complete search history.

(56) References Cited

U.S. PATENT DOCUMENTS

| | | | |
|---|---|---|---|
| 7,539,709 B1 * | 5/2009 | Vengerov | G06F 17/30067 |
| 2008/0046483 A1 * | 2/2008 | Lehr | G06F 11/1451 |
| 2009/0157756 A1 | 6/2009 | Sanvido | |
| 2010/0250831 A1 * | 9/2010 | O'Brien | G06F 11/3433 |
| | | | 711/103 |
| 2010/0281230 A1 * | 11/2010 | Rabii | G06F 3/0605 |
| | | | 711/165 |
| 2013/0179631 A1 * | 7/2013 | Cepulis | G06F 3/0616 |
| | | | 711/103 |

FOREIGN PATENT DOCUMENTS

WO    2013065081 A1    5/2013

* cited by examiner

*Primary Examiner* — Pierre-Michel Bataille
(74) *Attorney, Agent, or Firm* — Park, Vaughan, Fleming & Dowler LLP (57) ABSTRACT

A system, method, and apparatus are provided for performing a transparent hybrid data storage scheme in which data are stored as blocks distributed among one or more flash-based storage devices (e.g., solid state drives) and one or more magnetic storage devices (e.g., magnetic disk drives). Files larger than a given size (e.g., 1 MB) are segmented into blocks of that size and stored on one or more devices; blocks of one file may be stored on devices of different types. Periodically, a utility function calculates utility values for each of some or all stored blocks based on frequency of access to the block, frequency of access of a particular type (e.g., random, sequential), a preference regarding where to store the block or the corresponding file, and/or other factors. Blocks having the highest utility values are subject to migration between devices of different types and/or the same type (e.g., for load-balancing).

15 Claims, 4 Drawing Sheets

TRANSPARENT HYBRID DATA STORAGE

BACKGROUND

This disclosure relates to the field of computer systems. More particularly, a system, method, and apparatus are provided for operating a transparent hybrid data storage scheme comprising multiple types of storage components, such as one or more SSDs (Solid State Drives/Disks/Devices) and one or more HDDs (Hard Disk Drives).

SSDs and HDDs each have advantages and disadvantages relative to each other. For example, SSDs offer faster access times and throughput, and greater bandwidth, but are more expensive in terms of a given unit of storage (e.g., megabyte, gigabyte), and will fail after some number of write operations.

Existing data storage schemes that feature both SSDs and HDDs tend to simply use the SSDs as temporary caches for data stored permanently on the HDDs. Instead of offering a total amount of data storage equal to the combined capacities of the SSDs and the HDDs, the capacity of such a scheme is determined by the capacity of the HDD(s). Also, because every access to the data storage scheme is via the SSDs, the throughput of the system is limited to that of the SSDs and the SSDs tend to wear out relatively quickly.

Some proprietary data storage schemes have been developed, but require commitment to the vendors' hardware and software platforms. These schemes typically work with an SSD or HDD at a disk-volume level or a disk-block level, and simply allocate individual files to a given disk or device based on some algorithm that users/operators cannot adjust or affect.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for implementing a transparent hybrid data storage scheme that employs multiple types of storage devices, such as traditional magnetic HDDs (Hard Disk Drives) and SSDs (Solid State Disks/Drives/Devices) or other flash-based memory. The data storage schemes disclosed herein are transparent in that they operate on a computing platform, which may be a user platform (e.g., a desktop computer, a workstation, a portable device) or a server platform, without a user or operator of the platform being aware of the types of storage devices in use or knowing how data are allocated to the devices. The user or operator (or an application) can, however, express a preference regarding where a particular file or set of files is stored (e.g., SSD or HDD), which the data storage scheme will use in determining where components of the file will be stored.

In some embodiments, a transparent hybrid data storage scheme may be implemented within a library (or operating system) that operates between user applications and a platform's underlying file system(s). In these embodiments, therefore, the storage schemes avoid any need to adopt a proprietary storage solution that ties an organization or user to a particular vendor of storage solutions, and installation and replacement of individual storage devices is routine.

In the disclosed embodiments, the total storage capacity of a transparent hybrid data storage scheme is equal to the total usable capacities of all devices (e.g., SSDs and HDDs), and the throughput (which may be measured in terms of I/O operations per second (IOPS)) and the bandwidth of the scheme are substantially equal to the total throughput and combined bandwidth of all the devices.

Various metrics are used to determine which data to store on the different types of devices and the individual devices of a given type, such as the amount of data to be stored (e.g., the size of a file), the total number of accesses (reads and/or writes) to the data during a given time period, the total number of accesses of a particular type (e.g., random, sequential) to the data during a given time period, a user preference, and/or others. These metrics may also be used to reallocate data within a scheme. For example, data may be moved from one type of device to another based on an observed pattern of access to the data.

In some embodiments, a large or relatively large user-level file is partitioned into multiple fixed-size blocks by the transparent hybrid data storage scheme, for distribution among the hybrid devices. An illustrative size for the blocks is 1 MB, but other sizes are also contemplated (e.g., multiple megabytes, 1 GB). In these embodiments, the blocks that comprise a given user-level file may be stored on different types of devices and on different devices of a given type.

For example, an initial allocation of a file's blocks may allocate them to the same device, may allocate them randomly, or may allocate or assign them in some other manner, depending on whether their likely pattern of access is known and/or if a user, operator, or application associated with the file indicates the type of device (e.g., SSD, HDD) where the file preferably would be stored. Thereafter, however, metrics such as those indicated above are accumulated and profiles or patterns of access to the blocks are assembled, which may cause one or more blocks to be reallocated or migrated.

If most access to a given file involves only a limited number of the file's blocks, those blocks may be migrated to faster storage (e.g., SSDs) if they are not already stored there, and/or blocks that are infrequently accessed may be migrated to slower storage (e.g., HDDs) if they are not already stored there. Therefore, for a large data file (e.g., a database file) of which only a portion is frequently accessed, the busy (or 'hot') portion(s) may reside on one or more fast SSDs, while the less busy (or 'cold') portion(s) reside on one or more slower HDDs. Thus, storage schemes described herein may dynamically or adaptively allocate and/or reallocate data among hybrid devices based on their access patterns, instead of performing static allocation to one type of device that may later turn out to be inappropriate if access to the data changes over time.

In some embodiments, a given storage block does not contain portions (or entireties) of more than one file. In other embodiments, however, multiple files or portions of multiple files may reside in one block.

Also, in some embodiments, in order to distribute wear on susceptible devices (e.g., SSDs), and/or for other purposes, loads on some types of devices may be balanced. This may involve placing 'hotter' or more frequently accessed blocks, and/or storing more blocks, on devices having longer remaining (estimated) lifespans than on other devices. Also, or instead, load-balancing may involve ensuring each device of a particular type stores a suitable portion of the blocks allocated to that type, or a number of blocks that correspond to a suitable amount of the expected input/output operations that will be experienced by the blocks allocated to that type.

To aid in the identification of hot and cold storage blocks for allocation, reallocation, or migration among storage devices, a utility function may be executed to calculate utility values of some or all blocks stored on the hybrid devices. In some embodiments, this utility function as applied to a given block combines factors reflecting the frequency of access to the block (e.g., number of I/O operations), pattern of access (e.g., the number or percentage of random or sequential I/O operations), amount of data in the block, user/operator/application preference, the application(s) associated with the block's data, the age of the block's data, etc. As discussed below, in different implementations, the factors involved in computation of a block's utility value may be combined in different ways.

Figure 1:
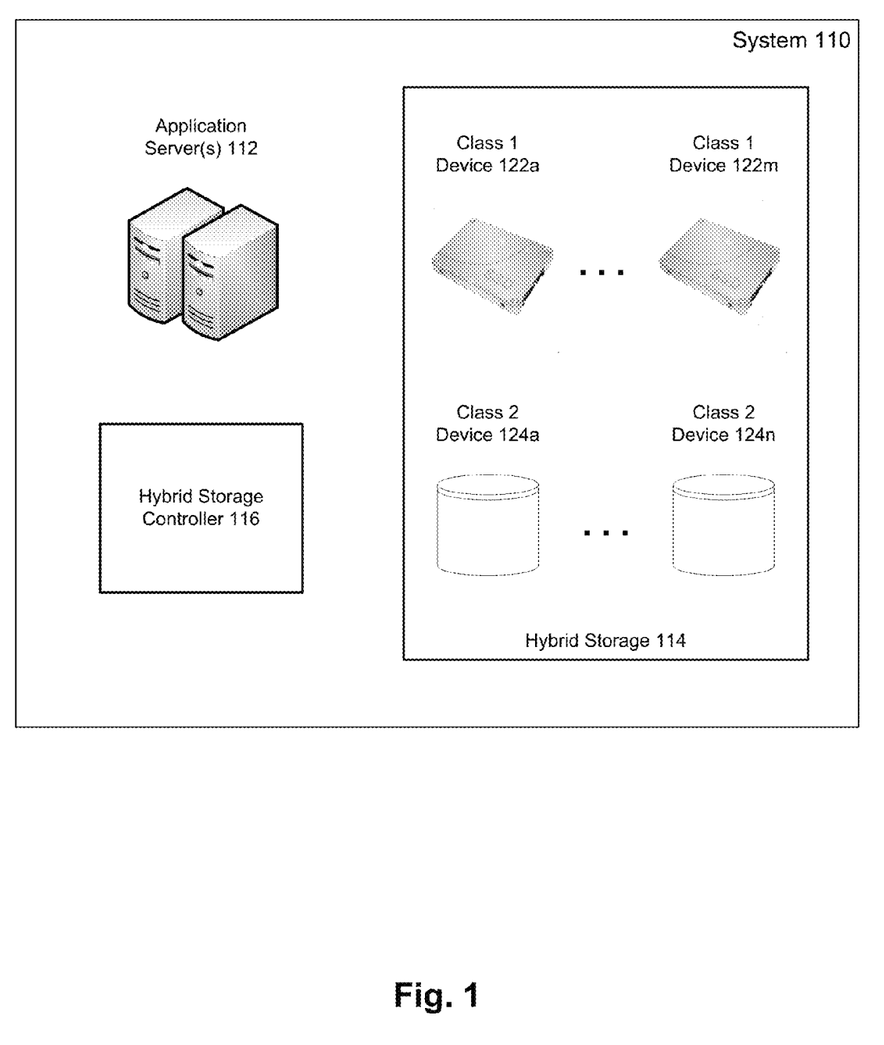
FIG. 1 is a block diagram depicting a computing environment in which a transparent hybrid data storage scheme may be implemented, in accordance with some embodiments.

FIG. 1 is a block diagram depicting a computing environment in which a transparent hybrid data storage scheme may be implemented, in accordance with some embodiments.

System 110 of FIG. 1 is (or is part of) a data center or other cooperative collection of computing resources, and includes different components in different embodiments. In the illustrated embodiments, the system includes server(s) 112 for hosting one or more applications and/or services, hybrid storage 114, and hybrid storage controller 116. Storage 114 and/or controller 116 may be configured as a data storage subsystem accessible to server(s) 112 and/or other computing platforms. In other embodiments, a hybrid data storage scheme may be implemented with or within a single computing platform, such as apparatus 400 of FIG. 4, which is discussed below.

Application server(s) 112 execute software programs that create, consume, and/or otherwise manipulate data stored within hybrid storage 114. Different applications or services may input or output data at different rates or throughputs, or with different bandwidths, may manipulate data collections (e.g., files, databases, objects) of different sizes, may operate with different priorities, may be executed with different regularity, and so on. As a result, hybrid storage 114 receives and transmits data having a variety of characteristics, in terms of throughput (e.g., input/output operations per unit of time), bandwidth (e.g., amount of data per unit time), size, priority (e.g., real-time, batch), etc.

Hybrid storage 114 includes two or more classes or types of data storage devices, each class including one or more devices. For example, class 1 devices 122a-122m may be solid state drives (SSDs) or other flash-based devices characterized by relatively low capacity, high throughput, high bandwidth, and high cost (as compared to class 2 devices), whereas class 2 devices 124a-124n may be hard disk drives (HDDs) or other magnetic devices characterized by relatively large capacity, low throughput, low bandwidth, and low cost (as compared to class 1 devices). In other embodiments, other quantities and types of devices may be implemented.

Hybrid storage controller 116 controls access to hybrid storage 114 on behalf of application server(s) 112 and/or other entities, and may be implemented within software that executes on individual servers 112, within one or more machines that include storage devices 122, 124, or within an intermediate machine (e.g., another server). In other embodiments, such as those in which hybrid storage 114 is part of a single platform (e.g., apparatus 400 of FIG. 4), controller 116 may be implemented as a library or API (Application Programming Interface) employed by an application that accesses the hybrid storage, or as part of an operating system, utility, or device driver.

Hybrid storage controller 116 allocates new data to devices 122, 124 using indicia or factors available at the time, and/or a default strategy for initial allocation of new data. Controller 116 also periodically reallocates and migrates data among devices, to place hot and cold data on appropriate types of devices, balance the loads of some or all devices, and/or for other purposes.

When a file is received by hybrid storage controller 116 for addition to hybrid storage 114, the controller partitions or divides the data into fixed-sized blocks (e.g., 1 MB) that are then written to one or more devices. When data are output to a client or consumer (e.g., an application server 112), the controller reads the data from the hybrid devices and reassembles it as necessary—such as when the requested data comprises contents of two or more blocks of a given file. If the data are then rewritten (i.e., the data are modified), the entire file (or files) that include the data may be re-partitioned and stored, or just the individual blocks that encompass the modifications may be updated or replaced.

System 110 may include other elements not depicted in FIG. 1. For example, the system may include other storage components, processing components, communication resources, and so on. Although only a single instance of a particular component of system 110 may be illustrated in FIG. 1, it should be understood that multiple instances of some or all components may be employed.

Figure 2:
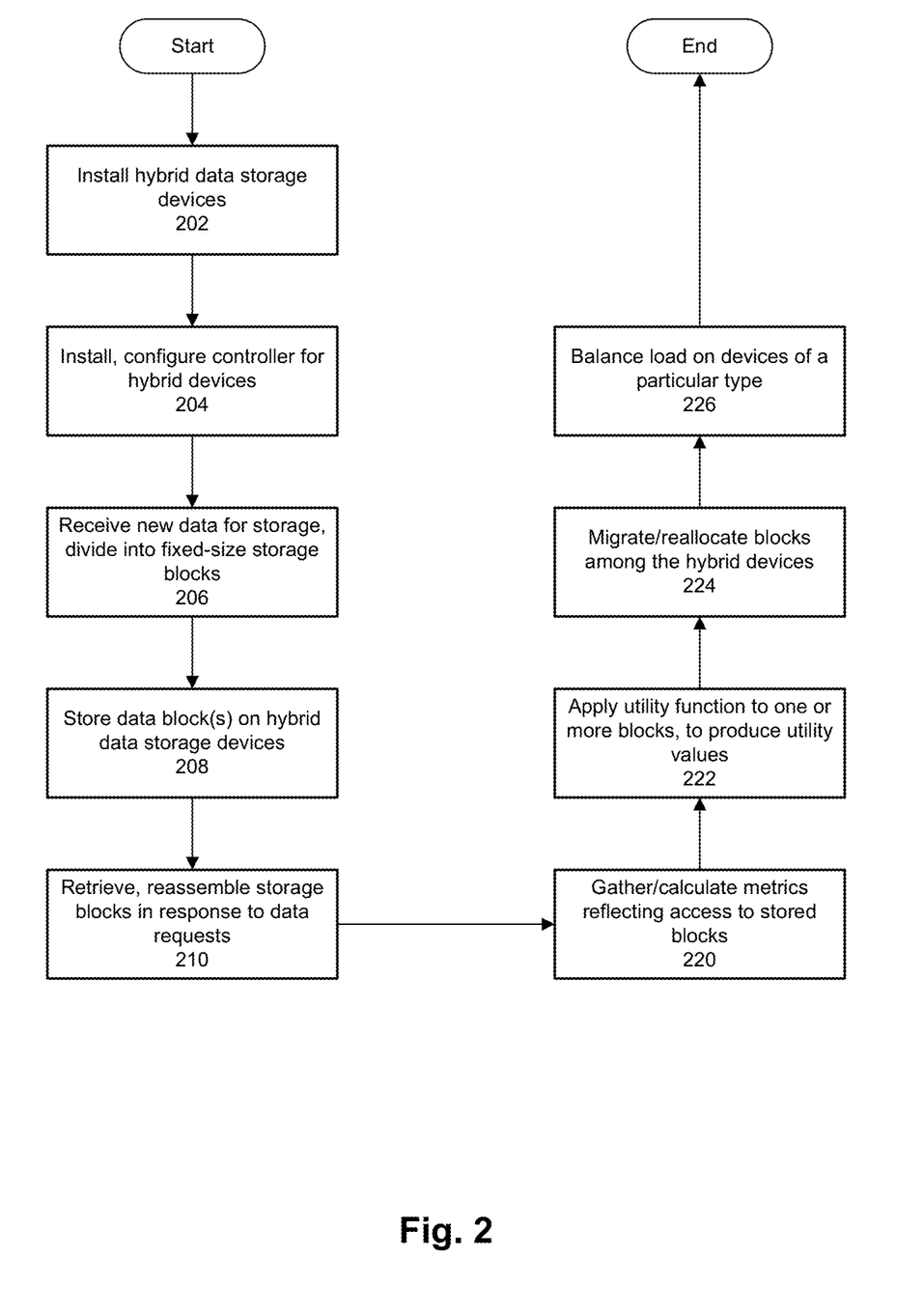
FIG. 2 is a flow chart illustrating a method of operating a transparent hybrid data storage scheme, in accordance with some embodiments.

FIG. 2 is a flow chart illustrating a method of operating a transparent hybrid data storage scheme, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In these embodiments, the hybrid data storage includes one or more solid state drives and one or more hard disk drives. In other embodiments, different types and/or quantities of devices may be employed.

A method of operating a transparent hybrid data storage scheme begins with installation of the hybrid devices (operation 202). In this method, the devices need no proprietary configuration in order to be used with the data storage scheme, and therefore virtually any commercially available device may be employed.

Also, a library, API, or other program code for implementing the transparent hybrid data storage scheme is installed (operation 204) if not already installed. This program code may be termed the storage controller, storage manager, data storage software, etc.

In different embodiments, controller code may be included with an application that will store data on the hybrid devices and/or use data stored on the devices, may be included in an operating system of a computing device or platform that hosts an application that uses data stored on the devices, may be implemented as a library (e.g., a user-level or application-level library) or a device driver, or may have some other form.

When a new file is received (e.g., from a user or application) for storage within the hybrid data storage scheme (operation 206), the storage controller determines whether it is greater than the size of a hybrid storage block (e.g., 1 MB, multiple megabytes, 1 GB). If so, the file is divided into multiple storage blocks. If it is less than or equal to the block size, it is stored in a single block.

The file, in the form of one or more storage blocks, is then stored on one or more devices in the hybrid data storage scheme (operation 208). If there is information indicating which device or which type of device (e.g., SSD, HDD) is more appropriate for the file, or for individual blocks, the file or blocks may be stored according to that information. For example, if the application or user nominates a particular type of storage (e.g., because of an expected or likely pattern of use in the future), the file/blocks may be stored accordingly.

In some other embodiments, all new files may initially be stored on an SSD, if they have available storage space, but the file's blocks may thereafter migrate (as described below) as access to the blocks is observed.

Because the file is new, metadata may be unavailable regarding how often the file has been used or accessed, whether access to the data tends to be random or sequential in nature, how much of the data is usually accessed at a time, and so on. When these metrics are not available, the new file/blocks may be stored on the least-loaded device(s), may be distributed across different devices randomly, or may be allocated in some other manner (e.g., round-robin). As discussed below, these metrics (and/or others) will be gathered after the file is stored, and may be used to determine a utility value of the file and/or its individual blocks, in order to determine where the file or blocks should be stored in order to improve performance of the data storage scheme.

As data are requested from the transparent hybrid data storage scheme, the corresponding blocks are read, assembled as necessary (e.g., to reconstitute entire files) and served in response to the requests (operation 210). In the illustrated method, the controller or some other entity maintains a mapping table identifying where each block of each file residing on the hybrid storage devices is stored, thereby facilitating retrieval of requested data.

During operation of the data storage scheme, the various metrics discussed herein, and/or others, are recorded by the storage controller, one or more monitor modules, and/or some other entity or entities (operation 220). In some embodiments, for example, metadata that are maintained for each storage block identify how often the block was accessed (e.g., in response to a user or application I/O operation), how the block or the block's data was accessed (e.g., sequentially, randomly), how much data was accessed, etc. A given data access to a given storage block may be considered sequential in nature if its starting offset (e.g., the first byte read) immediately follows the ending offset (e.g., the last byte read) of the previous access to the block, or random if the starting offset does not immediately follow the ending offset of the previous access.

Some metrics (e.g., total frequency of access, frequency of random access, frequency of sequential access) may be smoothed by applying an exponential moving average or exponential weighted moving average. For example, a moving average may be applied to values of these metrics as measured, observed, or accumulated for each of multiple regular periods of time (e.g., 1 hour, 30 minutes, 1 minute).

The value T is used herein to represent the total frequency of access of a block of data, an entire file, or some other amount of data, while the value R is used to represent the frequency of random access to the data. Other values may be used also, or instead, such as S to represent the frequency of sequential access to data.

Based on the gathered metrics and/or other information, a utility function is applied to one or more stored blocks to produce corresponding utility values (operation 222). As discussed below, the utility value of a given block will be used to help determine which type of hybrid storage device the block should be stored on, and/or which specific device. The utility value of a given block may be recalculated on a regular or periodic schedule, and any number of blocks' values may be calculated in concert.

In some embodiments, the utility function as applied to a block includes three components, one of which corresponds to total access to the block during a period of time (based on T), and one of which corresponds to random accesses to the block during a period of time (based on R). The third component, which may be designated U, is based on a user, operator, or application preference—such as 1 if the user/operator/application requests or prefers the block (or the file that includes the block's data) be stored on one type of device (e.g., an SSD) or 0 for a different type of device (e.g., an HDD). U may be a constant value expressed once when a file is initially stored, or may be dynamic, and may depend on an application that uses the file, the type of file (e.g., a document, a data file, a drawing, an image), a preference expressed directly by a user or operator, or may be determined in some other way.

In some implementations, each time T and R are calculated (and/or U is updated) for a block, the block's utility value V is recomputed as $$V = e^{\left(\frac{-1}{R}\right)} + e^{\left(\frac{-1}{T}\right)} + U.$$

In this equation, the total access and random access metrics may be normalized by decay functions that leave them proportional to the values that were observed or measured (and that may have been smoothed, as indicated above).

In other implementations, the three components of a block's utility value may be combined in some other way, such as by weighting the components. For example, if it is determined that it is most important to store randomly accessed data on the SSDs, the corresponding (R) component may be weighted relatively heavily. Conversely, if it is determined that it is most important to store the most frequently accessed data on the SSDs, regardless of whether their access is random or sequential in nature, the corresponding (T) component may be weighted more.

Based on a block's utility value V, it may migrate or be reallocated from one device, or one type of device, to another (operation 224). In some embodiments, a target number N of storage blocks to store on a given type of device, such as SSDs or other relatively high-performance devices, may be identified. For example, based on the total storage capacity of the SSDs, and/or the total recommended usage of those devices (e.g., to allow for garbage collection and/or other device maintenance), N may be derived accordingly. Therefore, if the total capacity of the SSDs in a hybrid data storage system is 10 TB, and if a target usage level of an SSD is 70%, then a target amount of data to store on the solid state devices is 7 TB. If the storage blocks within the hybrid data storage scheme are 1 MB in size, N=7 million and up to 7 million storage blocks having the highest utility values—the 'hottest' blocks—may be targeted for storage on the high-performance devices.

In other embodiments, migration or reallocation of storage blocks may focus on a different type of device, such as HDDs or other relatively high-capacity (and/or low-performance) devices. In these embodiments, a target number M of blocks may be identified and the M blocks with the lowest utility values—the 'coldest' blocks—may be targeted for storage on the low-performance devices.

Thus, based on blocks' utility values, and a number (or percentage) of storage blocks targeted for storage on a particular type of device, in operation 224 blocks not already stored on that type of device may be moved to devices of that type if their utility values place them in the target collection of blocks. Similarly, blocks already stored on that type of device that are not (or are no longer) among the target blocks (based on their utility values), may be moved to a different type of device, especially if storage space needs to be freed in order to accept the hot blocks.

When a given block is migrated from one type of device to another, it may be moved to the least-loaded device of the destination type or to a device selected in some other way (e.g., round-robin, random), or the block's destination may be determined through a load-balancing process discussed below. Therefore, in different embodiments, migration/reallocation of blocks may occur on a block-by-block basis (e.g., to move each of multiple blocks as they are identified) or blocks moving to or from a particular type of device may first be identified and then moved after determining how to distribute (or load-balance) the identified blocks in an intelligent manner.

The migration/reallocation process may be performed periodically (e.g., every hour, every half hour), possibly in conjunction with recalculation of some or all blocks' utility values. Not all blocks' utility values need be recalculated at the same time and, similarly, the migration/reallocation process need not (but may) be applied to all blocks at the same time.

The load (e.g., number of stored blocks, amount of stored data, frequency and/or type of access expected for the stored blocks) on devices of a particular type may be balanced (operation 226) separately from or as part of the migration/reallocation process. In the method depicted in FIG. 2, load-balancing is described as it may be executed separately, but one of ordinary skill in the art will appreciate how the load-balancing may be performed during the migration or reallocation of blocks. This operation may be repeated for each of multiple types of hybrid devices.

A goal of load-balancing is to attempt to equalize the loads on each device of a particular type. For devices of a type susceptible to failure after some number of operations (e.g., SSDs), the load-balancing may be based at least partly on their remaining lives. For this type of devices, remaining lifetimes may be tracked externally (e.g., by a transparent hybrid data storage controller) and/or internally (e.g., by the devices themselves).

If all devices of the particular type have substantially similar lives remaining, then the N blocks designated for storage on that type may be divided among them equally or approximately equally by dividing the number of blocks N by the number of devices D of that type to yield each device's load L (L=N/D).

Otherwise, based on a given device's expected remaining life, as compared to the other devices of the same type, it may be allocated more or fewer blocks. Thus, if one device has an estimated remaining lifetime approximately 10% longer than the average estimated remaining lives of all devices of the particular type, it may be allocated approximately 10% more blocks than the other devices. For example, after the devices' equal load L is calculated above (L=N/D), the actual loads assigned to the longer-lived device(s) may be determined by adding an additional percentage of L corresponding to their extra lives (e.g., L+0.1 L for a device having a 10% longer life).

The total extra load allocated to the longer-life devices may then be used to reduce the equal loads L allocated to shorter-lived devices. Illustratively, the total extra load may be divided equally among the shorter-lived devices, or the total extra load assigned to the longer-life devices may be apportioned among the other devices based on their remaining lives, wherein loads assigned to devices having the shortest remaining lives are decreased the most.

In another illustrative load-balancing process for a particular type of device, devices of that type are assigned statuses reflecting whether they currently store more or fewer blocks than an equal distribution of the type's N blocks require (e.g., L=N/D for D devices). For example, devices of that type that store more than L blocks may be assigned a first status indicating that they are overloaded. Devices that store fewer than L blocks may be assigned a second status indicating that they are underloaded. If necessary to distinguish them, devices that currently store their equal share L of blocks may be assigned a third or neutral status. Then, blocks are reallocated or migrated from overloaded devices to underloaded devices.

As will be recognized by one of ordinary skill in the art, balancing the total load allocated to one type of device among all devices of that type may be implemented with varying degrees of exactitude in different embodiments. For example, either or both the number of blocks to assign to a device and/or the total workload (e.g., expected number and/or type of input/output operations) represented by different blocks may be used to ensure that devices incur substantially similar loads (e.g., by storing approximately equal numbers of blocks and/or will experiencing approximately equal numbers/types of operations). Allowance for some devices' expected lifetimes may also be considered, as already discussed.

After operation 226, the method of FIG. 2 may end or may return to a previous operation.

Figure 3:
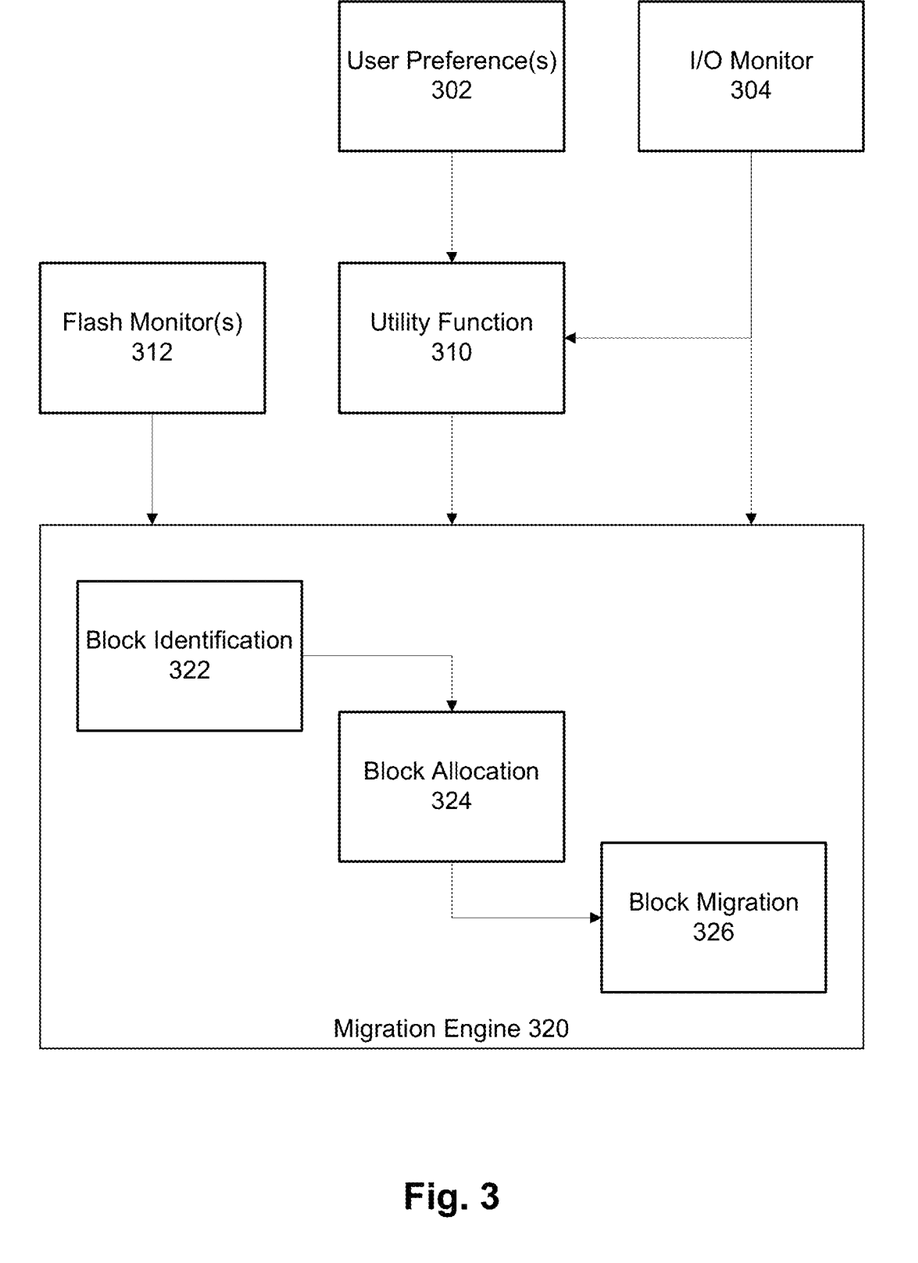
FIG. 3 is a block diagram of migration of data between storage devices within a transparent hybrid data storage scheme, according to some embodiments.

FIG. 3 is an illustration of the allocation and migration of data among storage devices within a transparent hybrid data storage scheme, according to some embodiments. In these embodiments, the storage scheme makes use of one or more flash-based storage devices (e.g., SSDs) and one or more magnetic disk drives (e.g., HDDs).

In these embodiments, user preference 302 includes preferences regarding storage of one or more user files (or blocks of one or more files) among the hybrid devices within the data storage scheme. Individual preferences may be expressed for different files or different types of files by a user, an operator, or an application associated with the file, or a default preference may be established for all files, files of a certain type, files of a certain size, or files having some other common characteristic(s). User preferences 302 are consumed by utility function 310, and may be in the form of discrete values—such as 1 for flash-based storage and 0 for storage on a magnetic drive. A predetermined value (e.g., 0.5) may be adopted as a user preference if no specific preference is expressed for a particular file or block.

I/O (input/output) monitor 304 monitors access to data stored on the hybrid devices. Illustratively, the I/O monitor tracks the total number of accesses, the number of accesses of one or more types or natures (e.g., random, sequential), and/or other metrics, for each of multiple (e.g., all) blocks stored on the devices. The metrics may be accumulated for regular, recurring time periods (e.g., 30 minutes, 1 hour), or for longer periods of time (e.g., multiple hours, a day), and are provided to utility function 310 and migration engine 320 when needed. The metrics may be adjusted (e.g., to smooth values in a time series, to discard anomalous or outlier values) before and/or after they are provided to those entities.

Utility function 310 uses metrics provided by I/O monitor 304, user preferences 302, and/or other information, to calculate utility values for some or all data blocks stored on the hybrid storage devices. In some implementations, calculation of a block's utility value involves summing the metrics provided by I/O monitor 304 and the user preference value for that block (or for the file that includes the block). As already indicated, the access metrics provided by the I/O monitor may be used as is (e.g., as values representing the frequency or numbers of access during a recent time period), may be averages (e.g., a moving average) of recent values, may be normalized or standardized (e.g., by applying a decay function or probability density function), or may be otherwise adjusted.

Flash monitor 312 monitors the estimated remaining lifetimes of the flash-based storage devices (e.g., SSDs). This information may be provided by the devices themselves (e.g., by interrogating them) and/or may be calculated by monitor 312 based on observed access to the flash-based storage devices. The estimated remaining lifetimes are supplied to migration engine 320, and may be used to assist in balancing loads on these devices, migrating blocks between devices, and/or for other purposes. Flash monitor 312 may also monitor available storage capacities of the flash-based storage devices (e.g., how many more blocks can be stored on them), the amount of data and/or number of blocks currently stored on each device, the amount/type of access experienced (and/or forecasted to be experienced) by the devices, and/or other statuses.

In the illustrated embodiments, migration engine 320 includes block identification module 322, block allocation module 324, and block migration module 326, and is invoked periodically to reallocate storage blocks as necessary or desired. Migration engine 320 or some other component not specifically depicted in FIG. 3 also allocates new files received for storage on the hybrid devices, which involves partitioning into blocks any files larger than one block, and distributing the files' blocks among the devices.

In some embodiments, block identification module 322 identifies hot blocks among the blocks already stored within the hybrid storage scheme. Hot blocks are those that should be stored on the flash-based storage devices in order to take advantage of the performance provided by those devices. Identification of hot blocks may be based on block utility values provided by utility function 310 and usage of (or access to) the flash-based devices as reported by flash monitor 312. In other embodiments, the block identification module identifies cold blocks—blocks that should be stored on the magnetic disk drives (e.g., because of their size, because of their infrequency and/or type of access).

The maximum number of blocks identified by module 322 may depend on the capacities of the flash-based devices, an acceptable or target level of usage of the devices, the fixed size of blocks in the hybrid data storage scheme (e.g., 1 MB), and/or other factors. In general, however, a threshold number N of blocks is chosen, which may represent the maximum number of blocks that can be stored on the flash-based devices or, in some embodiments, some number less than the maximum number of blocks the flash-based devices can accommodate.

Module 322 then identifies up to N specific blocks as being the hottest—those that have the highest utility values, for example. For purposes of discussion, it will be assumed that the block identification module identifies N hot blocks, although the actual number selected for migration or possible migration may be less than N.

Block allocation module 324 operates to allocate to each flash-based device a suitable share of the N blocks identified by block identification module 322. A device's share may depend on its current level of usage, meaning that devices that are fuller may receive fewer of the N blocks. The allocation module may also strive to balance the I/O load of (e.g., the expected number and/or type of accesses to) the flash devices, based on their estimated remaining lives, and may also attempt to minimize the number of blocks that must be transferred from one type of device (e.g., a magnetic hard drive) to another type of device (e.g., a flash-based device), or from one flash-based device to another flash-based device.

In an illustrative block allocation process, the N blocks are ordered by their utility values, such that the hottest block is at one end of the list (or queue or other structure) and the coldest of the hot blocks is at the other end. Similarly, the flash-based devices may be ordered based on their current loads or the number of additional blocks or additional load they can receive. A given device's position in the list of devices may depend on the total number of blocks currently stored on the device, the total utility values of the blocks stored on the device, the frequency of access to the device's stored blocks during a period of time (e.g., the I/O load experienced by the device), the frequency of a particular type of access (e.g., random) to the device's blocks, and/or other factors.

Starting with the flash-based device having the lowest current load, blocks may be allocated to the device from the head of the list of hot blocks until the device has its proportionate share of the load (e.g., of the N blocks). If allocating the block at the head of the list would increase the device's load more than its proportionate share, one or more blocks may instead be allocated from the tail of the list.

In some embodiments, to avoid excessive migration of blocks, some or all blocks that are among the N hottest blocks but that are already stored on flash-based devices may not be moved between devices unless, perhaps, one or more of the devices are notably overloaded or underloaded. During the migration process, blocks that are not among the N hottest blocks may be moved from the flash-based devices to the magnetic hard drives in order to accommodate the hot blocks. In some implementations, in order to avoid thrashing, before a given block is moved from one type of device to another, it may have to be nominated (e.g., by block identification 322) for such movement a threshold number of times (e.g., more than just once).

After blocks are allocated to the hybrid devices by block allocation module 324, block migration module 326 executes the actual movement of blocks. This movement may be performed during a period of low or relatively low input/output operations, may be scheduled for a particular time (of expected low activity), or may be performed opportunistically when demand on the hybrid storage scheme is relatively low.

Figure 4:
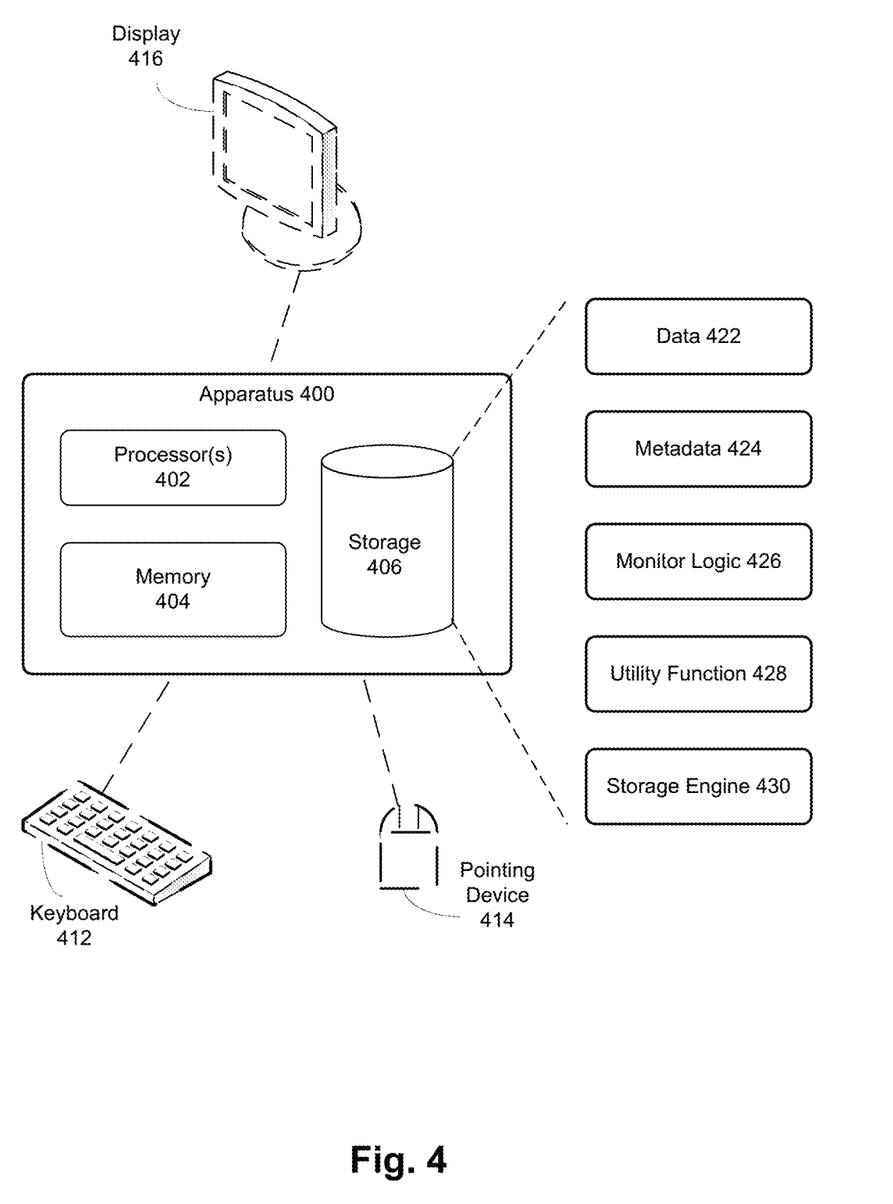
FIG. 4 depicts an apparatus for operating a transparent hybrid data storage scheme, in accordance with some embodiments.

FIG. 4 depicts an apparatus for operating a transparent hybrid data storage scheme, according to some embodiments.

Apparatus 400 of FIG. 4 includes processor(s) 402, memory 404, and storage 406, which may comprise any number of solid-state, magnetic, optical, and/or other types of storage components or devices. Storage 406 may be local to or remote from the apparatus. Apparatus 400 can be coupled (permanently or temporarily) to keyboard 412, pointing device 414, and display 416.

Storage 406 stores data 422 created and/or manipulated by one or more users/operators of apparatus 400, using any number of applications that execute on apparatus 400 but that are not depicted in FIG. 4. Data 422 primarily comprises blocks of user/application-level files. Because data are stored at the file or block level, there is no need to alter the filesystem or filesystems implemented by storage 406 or by individual storage components. This contrasts with some proprietary storage solutions in which a storage device uses proprietary methods to pack data into storage volumes and that supersede or replace a computing platform's normal filesystem(s).

Storage 406 also stores metadata used by apparatus 400 to implement a transparent hybrid data storage scheme to efficiently store elements (e.g., blocks) of data 422 on the various components of storage 406. Metadata 424 may include statistics regarding frequency of access to elements of data 422, frequency of specific types of access (e.g., random, access), user/operator/application preferences regarding where to store a file or an element of a file, remaining lifetimes of storage components susceptible to wear, available capacities of storage components, current loads on the storage components, and/or other information.

Storage 406 also stores logic and/or logic modules that may be loaded into memory 404 for execution by processor(s) 402, including one or more monitor logic modules 426, utility function logic 428, and storage engine logic 430. In other embodiments, any or all of these logic modules may be aggregated or divided to combine or separate functionality as desired or as appropriate.

Monitor logic 426 comprises processor-executable instructions for monitoring access to elements of data 422, and may produce or maintain some of metadata 424. Different instances or versions of monitor logic 426 may monitor different activity or types of activity regarding data 422, and/or may monitor different types of devices or different specific devices. For example, an I/O monitor logic module may monitor input/output operations involving some or all elements of data 422, while a flash monitor module may monitor remaining lifetimes and/or other statuses of solid state storage devices (e.g., remaining capacity, recommended usage levels). Logic 426 may comprise all or part of flash monitor 312 and I/O monitor 304 of FIG. 3.

Utility function logic 428 comprises processor-executable instructions for executing a utility function that calculates utility values for some or all elements of data 422. Logic 428 may use metadata 424 and/or other information in the calculations. Logic 428 may comprise all or part of utility function 310 of FIG. 3.

Storage engine logic 430 comprises processor-executable instructions for managing operation of a transparent hybrid data storage scheme. Logic 430 may therefore allocate elements of new files to hybrid storage components, receive (and store in metadata 424) user preferences regarding where to store selected data, receive utility values output by utility function logic 428, retrieve/update/maintain metadata 424, migrate elements of data 422 among hybrid storage components of storage 406, balance loads on one or more types of hybrid storage components, retrieve requested data 422 from storage 406, and/or perform other actions.

In some implementations, however, one or more other logic modules handle partition and storage of new files, and receipt/storage of user/operator/application preferences for storing the files, while storage engine 430 is directed to migration of data after the files are stored. Storage engine logic 430 may comprise all or part of migration engine 320 of FIG. 3.

In some embodiments, hybrid storage controller 116 of system 110 of FIG. 1 comprises all or most of monitor logic 426, utility function 428, and storage engine 430.

In some specific embodiments, storage 406 includes multiple flash-based storage components/devices and one or more magnetic storage components/devices, and elements of a single file may be stored on different devices of a given type and/or on different types of devices. Therefore, it is possible that some (but not all) elements of a given file may migrate among devices, depending on a frequency and/or type of access to those elements. A user/operator/application preference may also affect where some or all of elements of a file are stored.

An environment in which one or more embodiments described above are executed may incorporate a data center, a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method comprising:
partitioning multiple files into fixed-sized blocks;
receiving, from a user of a first file among the multiple files, a user preference regarding a type of storage device on which to store the first file;
load-balancing a first portion of the blocks among one or more flash-based storage devices based on one or more of:
  remaining lifetimes of the one or more flash-based storage devices; and
  predicted future access to the first portion of blocks;
storing a second portion of the blocks on one or more magnetic storage devices;
periodically executing a utility function to calculate utility values of each of the blocks; and
migrating a plurality of the blocks between the flash-based storage devices and the magnetic storage devices based on the utility values.

2. The method of claim 1, further comprising, for each of the plurality of blocks:
monitoring a number of accesses to the block;
monitoring a number of accesses to the block that are of a particular type; and
identifying a user preference regarding storage of the block on a flash-based storage device or a magnetic storage device.

3. The method of claim 2, wherein executing the utility function for a given block among the plurality of blocks comprises:
combining the number of accesses to the given block, the number of accesses to the block that are of a particular type, and the user preference;
wherein the particular type is one of random access and sequential access.

4. The method of claim 3, wherein the number of accesses to the given block and the number of accesses to the block that are of a particular type are modified by a decay function prior to said combining.

5. The method of claim 1, wherein at least one block of a first file is stored on a flash-based storage device and at least one other block of the first file is stored on a magnetic storage device.

6. An apparatus, comprising:
one or more processors; and
memory storing instructions that, when executed by the one or more processors, cause the apparatus to:
  partition multiple files into fixed-sized blocks;
  receive, from a user of a first file among the multiple files, a user preference regarding a type of storage device on which to store the first file;
  load-balance a first portion of the blocks among one or more flash-based storage devices based on one or more of:
    remaining lifetimes of the one or more flash-based storage devices; and
    predicted future access to the first portion of blocks;
  store a second portion of the blocks on one or more magnetic storage devices;
  periodically execute a utility function to calculate utility values of each of the blocks; and
  migrate a plurality of the blocks between the flash-based storage devices and the magnetic storage devices based on the utility values.

7. The apparatus of claim 6, the memory further storing instructions that, when executed by the one or more processors, cause the apparatus to, for each of the plurality of blocks:
monitor a number of accesses to the block;
monitor a number of accesses to the block that are of a particular type; and
identify a user preference regarding storage of the block on a flash-based storage device or a magnetic storage device.

8. The apparatus of claim 7, wherein executing the utility function for a given block among the plurality of blocks comprises:
combining the number of accesses to the given block, the number of accesses to the block that are of a particular type, and the user preference;
wherein the particular type is one of random access and sequential access.

9. The apparatus of claim 8, wherein the number of accesses to the given block and the number of accesses to the block that are of a particular type are modified by a decay function prior to said combining.

10. The apparatus of claim 6, wherein at least one block of a first file is stored on a flash-based storage device and at least one other block of the first file is stored on a magnetic storage device.

11. A system, comprising:
at least one processor;
at least one flash-based storage device;
at least one magnetic storage device;
a storage allocation module comprising a non-transitory computer-readable medium storing instructions that, when executed, cause the system to:
  partition multiple files into fixed-sized blocks;
  receive, from a user of a first file among the multiple files, a user preference regarding a type of storage device on which to store the first file;
  load-balance a first portion of the blocks among one or more of the flash-based storage devices based on one or more of:
    remaining lifetimes of the one or more flash-based storage devices; and
    predicted future access to the first portion of blocks; and
  store a second portion of the blocks on one or more of the magnetic storage devices;
a utility module comprising a non-transitory computer-readable medium storing instructions that, when executed, cause the system to periodically execute a utility function to calculate utility values of each of the blocks; and
a migration module comprising a non-transitory computer-readable medium storing instructions that, when executed, cause the system to migrate a plurality of the blocks between the flash-based storage devices and the magnetic storage devices based on the utility values.

12. The system of claim 11, further comprising:
a monitor module comprising a non-transitory computer-readable medium storing instructions that, when executed, cause the system to, for each of the plurality of blocks:

monitor a number of accesses to the block; and
monitor a number of accesses to the block that are of a particular type; and
a preference module comprising a non-transitory computer-readable medium storing instructions that, when executed, cause the system to, for each of the plurality of blocks:
identify a user preference regarding storage of the block on a flash-based storage device or a magnetic storage device.

13. The system of claim 12, wherein executing the utility function for a given block among the plurality of blocks comprises:
combining the number of accesses to the given block, the number of accesses to the block that are of a particular type, and the user preference;
wherein the particular type is one of random access and sequential access.

14. The system of claim 13, wherein the number of accesses to the given block and the number of accesses to the block that are of a particular type are modified by a decay function prior to said combining.

15. The system of claim 11, wherein at least one block of a first file is stored on a flash-based storage device and at least one other block of the first file is stored on a magnetic storage device.

* * * * *